Figure 3:
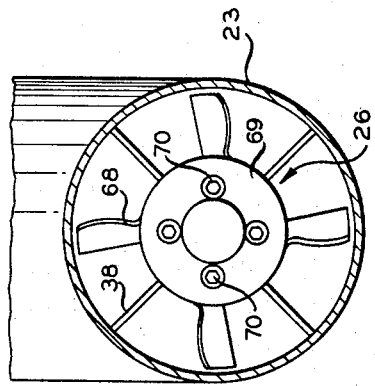

Oct. 8, 1968  R. G. ROHLFING  3,405,109
POLYMERIZATION PROCESS
Original Filed Oct. 3, 1960

INVENTOR
R. G. ROHLFING
BY
Young & Quigg
ATTORNEYS

United States Patent Office 3,405,109
Patented Oct. 8, 1968

3,405,109
POLYMERIZATION PROCESS
Raymond G. Rohlfing, Bartlesville, Okla., assignor to Phillips Petroleum Company, a corporation of Delaware
Original application Oct. 3, 1961, Ser. No. 59,991, now Patent No. 3,226,205, dated Dec. 28, 1965. Divided and this application Jan. 25, 1965, Ser. No. 427,651
5 Claims. (Cl. 260—88.2)

This application is a divisional of application Ser. No. 59,991, filed Oct. 3, 1960, now U.S. patent 3,226,205.

This invention relates to an improved polymerization process.

A unique reactor in the form of a continuous upright loop and a polymerization process effected therein are disclosed in the application of Norwood, S.N. 819,391, filed June 10, 1959, entitled, "Method and Apparatus for the Production of Solid Polymers of Ethylene," now abandoned. In the disclosed process, solid particulate polymer insoluble in the hydrocarbon diluent used in the process is continuously formed. Deposition of the polymer is prevented by maintaining the fluid flow rate thru the reactor in the high turbulence range. The high turbulent flow is effected by one or more impellers positioned coaxially within a section of the loop conduit and operated by a shaft extending thru an outboard bearing. The inner end of the shaft is supported by an inboard bearing positioned adjacent the impeller.

In conducting the process in the reactor of said application, polymer gradually deposits on the inboard bearing and in the area between the impeller hub and the bearing so that after about 3 to 5 days of continuous operation, shut down is required in order to remove the polymer and permit continuous operation of the impeller. This invention provides means and method of operating such a device while preventing deposition of polymer in the impeller area, thereby avoiding the necessity of shutdown to remove the polymer.

Accordingly, it is an object of the invention to provide an improved method for producing solid particulate form polymers. Another object is to provide an improved process for preparing solid particle form polymer in a loop reactor, wherein liquid monomer(s), diluent, polymer, and catalyst are circulated and mixed therein by an impeller, which avoids deposition of polymer on the impeller bearing and shaft. Other objects of the invention will become apparent upon consideration of the accompanying disclosure.

The foregoing objects are realized, broadly, by introducing gaseous feed to the reaction zone thru a conduit or sleeve enclosing the impeller shaft so that the fluid feed flows thru the inboard bearing and the area adjacent the hub of the impeller and said bearing. In this way the area adjacent the inboard bearing and impeller hub is maintained free of polymer.

While the invention is particularly advantageous when utilized in a continuous loop reactor of the character described in the above-identified application, it is applicable to any reactor or process in which polymer or other solid material tends to deposit around an impeller hub and inboard bearing supporting the impeller shaft.

A polymerization process in which the invention is particularly advantageous involves the polymerization of 1-olefins having a maximum of 8 carbon atoms per molecule and no branching nearer the double bond than the 4-position. Examples of olefins which can be polymerized by the process include ethylene, propylene, 1-butene, 1-pentene, and 1,3-butadiene. Copolymers, such as ethylene-propylene copolymers and ethylene-butadiene copolymers, can also be prepared by utilizing a chromium oxide-containing catalyst. The temperature for the polymerization reaction is usually in the range of about 100 to about 500° F. with a temperature in the range of 275 to 375° F. being often preferred for the polymerization of ethylene. The olefins are polymerized in the presence of a hydrocarbon diluent, for example, an acyclic, alicyclic or aromatic compound which is inert.

A catalyst effective in the polymerization process comprises, as an essential ingredient, chromium oxide including a substantial amount of hexavalent chromium. The chromium oxide is associated with at least one other oxide selected from the group consisting of silica, alumina, zirconia, and thoria. A more detailed disclosure of the polymerization process which produces solid polymers is found in Hogan et al., U.S. Patent 2,825,721. The broad operating conditions include a temperature in the range of about 100 to 500° F. with a preferred temperature range of 275 to 375° F. for the polymerization of ethylene. When operating in the temperature range of about 150 to 225° F., which is a rather critical range within the temperature range disclosed by said patent, it is possible to produce increased yields of high molecular weight polymers of ethylene which are insoluble in the hydrocarbon diluent. This polymer is formed in association with the polymerization catalyst and is suspended in the liquid diluent in solid particle form.

The preparation of insoluble particle form polymer is disclosed in the copending application of Leatherman et al., S.N. 590,567, filed June 11, 1956, now abandoned. In the discussion herein, the term "particle form polymer" designates the insoluble polymers of ethylene formed in accordance with the process of the Leatherman et al. application.

Particle form polymer can be prepared from ethylene and from mixtures of ethylene with other unsaturated hydrocarbons, for example, mixtures of ethylene with minor amounts of higher 1-olefins, such as propylene, 1-butene, 1-pentene, 1-hexene, and the like. Examples of comonomers which can be used with ethylene include 1-olefins having no branching nearer the double bond than the 4-position and conjugated and non-conjugated diolefins. The polymerization reaction is carried out in the presence of a liquid hydrocarbon diluent which is inert in the polymerization reaction and in which the polymer is insoluble under reactor conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane, methylcyclopentane, methylcyclohexane, etc. The polymerization reaction temperature to be used will vary, depending on the particular liquid diluent which is employed and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent at the aforementioned temperature and under pressures suitable to maintain the diluent in the liquid phase. Concentration of the catalyst in the reaction zone can vary widely; however, generally it will be in the range of 0.001 to 5 percent by weight based on the liquid hydrocarbon diluent. For a more detailed description of the polymerization process including reaction conditions, catalyst, etc., reference can be had to said copending application of Leatherman et al.

Figure 2:
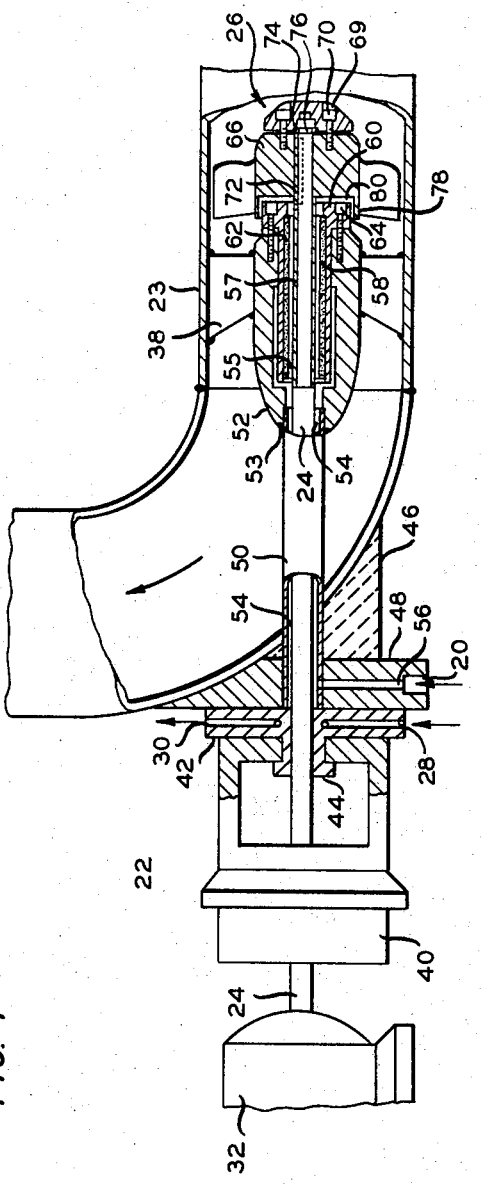
Figure 1:
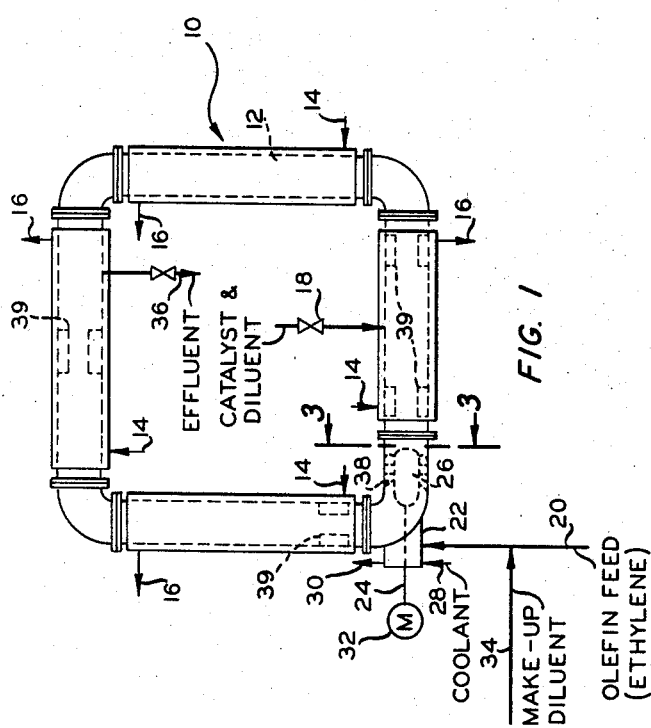

A more complete understanding of the invention may be had by reference to the accompanying schematic drawing of which FIGURE 1 is an elevation of an upright loop reactor; FIGURE 2 is an elevation in partial section of the impeller section of FIGURE 1; and FIGURE 3 is a transverse cross sectional view of the impeller of FIGURE 1 taken on the line 3—3.

Referring to FIGURE 1, reactor 10 which is a rectangular shaped upright loop reactor is of flanged straight pipe sections and ells joined together to provide a continuous path which is substantially free from obstructions and has smooth inside walls. Each straight pipe section is jacketed by sections 12 which contain inlet 14 and outlet 16 for introduction and removal, respectively, of heat exchange fluid. Conduit 18 is provided for introduction of catalyst and diluent. This conduit may be located either upstream or downstream of the hereinafter described impeller. The olefin feed is introduced through line 20 into outboard seal and bearing assembly 22 from which it passes along shaft 24 and into the reactor space around impeller 26 positioned in ell 23 which will be more fully described in connection with FIGURE 2.

Bearing coolant is introduced through line 28 and vented through line 30. Motor 32 is operatively connected with shaft 24 for operating impeller 26. Makeup diluent is introduced through line 34 to line 20 from which it passes along shaft 24 to the impeller. The diluent introduced to line 18 along with catalyst is usually diluent recovered from the effluent withdrawn through line 36. Since this diluent contains some polymer, it is unsuitable for introduction into line 20.

Referring to FIGURE 2, the bearing seal assembly 22 comprises an outboard bearing 40 of any suitable type for supporting the outer end of shaft 24. A sealing ring 42 and a packing gland are provided to seal the shaft outside of the reactor ell 23. The bearing sealing assembly is attached to ell 23 by means of a housing support 46 welded to ell 23 and to member 48. A sleeve 50 extends from within member 48 to the inboard bearing housing 52 to which it is sealed by weld 53. Sleeve 50 provides a passageway 54 with shaft 24 and connects with passageway 56 to which line 20 is attached for injecting ethylene or other polymerizable olefin into the reactor as will be seen from the ensuing description of the inboard bearing and impeller detail.

Inboard bearing housing 52 is attached to the wall of the reactor at three or four uniformly circumferentially spaced radial positions by radial supports 38 which are thin plates extending longitudinally of the reactor tube to provide as little resistance to flow as possible. The preferred arrangement of these supports is 120° apart, utilizing three in the assembly. Supports 38 also serve as straightening vanes in the area just downstream of impeller 26. Straightening vanes 39, extending longitudinally and radially of the loop conduits are also provided in other sections of the loop as shown in FIGURE 1. Shaft 24 extends through housing 52 and is provided with a shaft sleeve bearing 57 of a suitable hard metal or alloy. A pair of bushings 58 encircle bearing sleeve 57 with about 10 to 30 thousandths of an inch clearance therewith to provide an extension 55 of passage 54 between the shaft and bushings. The bushings 58 are held in position by bearing shell 60 which is provided with a shoulder 62 adapted to engage the outer end of the outermost bushing. Cap screws 64 attach bushing shell 60 to housing 52.

The impeller 26 comprises a hub 66 to which are rarially attached a plurality of blades 68. A lock collar 69 is attached to the end of hub 66 by means of cap screws 70. Hub 66 is keyed to shaft 24 by means of key 72. Lock ring 74 is fitted in groove 76 on the outer end of the shaft and engages the end of hub 66 to hold the same in place on the shaft.

A skirt or flange 78 on the back end of the hub surrounds the forward end of the bearing assembly and forms a passageway 80 therewith which connects with the bushing clearance passageway 55 and thereby with passageway 54 to complete the path for the olefin feed injected through the sleeve and bearing assembly. Impeller blades 68 are angled about 18° to force liquid in the ell in the direction shown by the arrows. In this manner, the flow of ethylene or other olefins, devoid of polymer, through the bearing assembly and along the hub prevents polymer deposition and keeps the same free for continuous operation.

FIGURE 3 shows impeller 26 and bearing support members 38 positioned within ell 23. It is to be understood that the number of supports 38 and impeller blades 68 may vary from that shown in this figure.

In preferred operation, all of the olefin feed to the reactor is injected through the passageway along the sleeve-shaft annulus and through the bearing-impeller hub assembly. This assures the prevention of polymer build up in the inboard bearing and between the impeller hub and the inboard bearing assembly. However, it is feasible to introduce a portion of the olefin feed directly into the reactor as through line 18, along with catalyst and diluent, or through a separate inlet upstream or downstream of the impeller.

It is to be understood that the details of construction with respect to the specific inboard bearing and the outboard bearing and seal assembly, together with the injection passageway for the olefin feed are illustrative of a preferred embodiment of the invention and are not to be interpreted as unduly restricting the invention. The essential feature of the invention is the injection of feed in fluid form to the reactor through a sleeve along the impeller shaft and through the inboard bearing so that it passes into the reaction area outside of the impeller hub skirt before contacting the catalyst in the reaction mixture. In this manner catalyst and polymer are prevented from entering the area between the hub and the bearing as well as the bearing itself, thereby avoiding polymer formation and deposition in the bearing and between the bearing assembly in the hub, which would interfere with the operation of the impeller.

A reactor such as that shown in the above-identified application (S.N. 819,391) comprising a 10" loop with a 12" ell (23), was operated in the production of solid particle form ethylene polymer by periodically injecting a flushing fluid thru the inboard bearing. However, only 3 to 5 days of operation was possible before build up of polymer around the inboard bearing and impeller hub required shutdown, due to high impeller load, for cleaning off the polymer from the apparatus.

The apparatus was converted to the arrangement described in this application and has been in continuous operation for more than a month without any evidence of polymer build up in the inboard bearing and between the impeller hub and the inboard bearing housing. Ethylene flow thru the bearing sleeve was in the range of 400–500 standard cubic feet per hour. In addition 12.5 gallons per hour of n-pentane was introduced with the ethylene. The balance of diluent, 6.25 gallons per hour, was introduced with the catalyst.

Turbulent flow required in the loop reactor in making solid particle form polymer and maintaining same in suspension in the diluent (n-pentane) requires a minimum flow rate of at least about 6 ft./sec. and preferably about 10 ft./sec. The flow rate may run as high as 25 or 30 ft./sec. in larger diameter reactors such as 16" to 20".

Certain modifications of the invention will become apparent to those skilled in the art and the illustrative details disclosed are not to be construed as imposing unnecessary limitations on the invention.

I claim:

1. In a process wherein solid particle form polymer is formed by continuously pumping polymerizable hydrocarbon material in liquid form thru a section of conduit by means of an impeller operating on a shaft on an inboard bearing wherein polymer settles around said bearing and hinders the operation of said impeller, the improvement comprising continuously forcing a fluid nondeleterious to said reaction free of catalyst thru an annular passageway surrounding said shaft and thru said bearing to the interior of said conduit so as to prevent settling of polymer in said bearing, on said shaft, and between said bearing and said impeller.

2. A process for continuously forming solid particle form polymer which comprises forcing a feed material in liquid form selected from the group consisting of ethylene and mixtures of ethylene with unsaturated hydrocarbons copolymerizable therewith thru a reaction zone in admixture with a polymerization catalyst effective in producing solid particle form polymer and with a liquid hydrocarbon diluent at a velocity in the highly turbulent flow range by means of an impeller positioned on a shaft extending into said zone and supported on an inboard bearing adjacent said impeller; continuously introducing at least a substantial portion of said feed material free of catalyst thru a sleeve surrounding said shaft and thru the bearing and impeller area so as to prevent polymer deposition on said bearing, on said shaft, and between said impeller and said bearing.

3. The process of claim 2 wherein said feed, diluent, and catalyst are circulated at high turbulence thru an endless loop, polymer is withdrawn from said loop remote from said impeller, and catalyst and diluent are introduced adjacent said impeller.

4. The process of claim 3 wherein said catalyst consists essentially of chromium oxide, including hexavalent chromium, deposited on at least one oxide of the group silica, alumina, thoria, and zirconia.

5. In a process wherein a normally solid polymer of ethylene selected from the group consisting of homopolymers of ethylene and copolymers of ethylene with a comonomer selected from the group consisting of propylene, 1-butene, 1-pentene and 1-hexene is produced by polymerization at a temperature in the range 150 to 225° F. in the presence of a chromium oxide polymerization catalyst and a liquid diluent selected from the group consisting of cyclohexane, cyclopentane, methylcyclopentane, methylcyclohexane and paraffins having from 3 to 8 carbon atoms per molecule, said polymer being formed as a suspension of solid particles in said diluent, and said catalyst being suspended in said diluent, by circulating a mixture of polymerizable feed of the class described, said catalyst, and said diluent thru a polymerization zone comprising an internally smooth unobstructed loop conduit at a turbulent flow rate of at least 6 feet per second, by means of an impeller supported within said conduit on an inboard bearing, the improvement comprising introducing the polymerizable material, free of polymer and catalyst, to said zone thru an enclosed flow path venting thru said bearing and thru the space intermediate said bearing and said impeller so as to prevent polymer deposition in said bearing and between said bearing and said impeller.

References Cited
UNITED STATES PATENTS 3,244,681   4/1966   Rohlfing et al.

JOSEPH L. SCHOFER, *Primary Examiner.*

L. EDELMAN, *Assistant Examiner.*